United States Patent [19]

Ruiz

[11] Patent Number: 4,728,485

[45] Date of Patent: Mar. 1, 1988

[54] METHOD FOR REGULATING THE PRESSURE OF THE PRIMARY CIRCUIT DURING THE SHUT-DOWN PHASES OF A PRESSURIZED WATER NUCLEAR REACTOR

[75] Inventor: Pierre Ruiz, Le Blanc-Mesnil, France

[73] Assignee: Framatome, Courbevoie, France

[21] Appl. No.: 771,186

[22] Filed: Sep. 3, 1985

Related U.S. Application Data

[63] Continuation of Ser. No. 534,265, Sep. 22, 1983, abandoned, which is a continuation of Ser. No. 254,369, Apr. 15, 1981, abandoned.

[30] Foreign Application Priority Data

May 14, 1980 [FR] France .................. 80 10874

[51] Int. Cl.$^4$ .............. G21C 9/00; G21D 3/00
[52] U.S. Cl. .................... 376/307; 165/40; 165/104.32
[58] Field of Search ............. 376/307; 165/40, 104.32

[56] References Cited

U.S. PATENT DOCUMENTS

| | | | |
|---|---|---|---|
| 3,060,110 | 10/1962 | Wainrib | 376/307 |
| 3,114,414 | 12/1963 | Judd | 376/307 |
| 3,722,578 | 3/1973 | Frei et al. | 376/307 |
| 3,981,444 | 9/1976 | Weiss | 165/40 |

Primary Examiner—Harvey E. Behrend
Attorney, Agent, or Firm—Pollock, Vande Sande & Priddy

[57] ABSTRACT

Method for regulating the pressure of the primary circuit of a pressurized water nuclear reactor during shut-down phases, by use of an installation comprising, as a branch circuit to the primary circuit, a volume control circuit with a discharge valve and a charging valve. When the liquid level in the pressurizer approaches the top, a constant flow rate is maintained at the charging valve, the flow rate of the discharge valve is regulated by direct measurement of the primary pressure, successive sprinklings through the valve follow and the reduction in discharge flow rate is detected until further sprinkling has no further effect on the discharge flow rate.

2 Claims, 2 Drawing Figures

METHOD FOR REGULATING THE PRESSURE OF THE PRIMARY CIRCUIT DURING THE SHUT-DOWN PHASES OF A PRESSURIZED WATER NUCLEAR REACTOR

This application is a continuation of application Ser. No. 534,265, filed Sept. 22, 1983, now abandoned, which is a continuation of Ser. No. 254,369, filed Apr. 15, 1981, now abandoned.

FIELD OF THE INVENTION

The present invention relates to a method for regulating the pressure of the primary circuit during the shut-down phases of a pressurized water nuclear reactor, and more particularly for regulation during the so-called "collapse" phase of the pressurizer.

DESCRIPTION OF THE PRIOR ART

The primary cooling circuit of a pressurized water nuclear reactor includes one or several loops wherein water circulates under the action of a primary pump between the core of the reactor where it absorbs the heat produced by the nuclear reaction, and a generator where it gives up this heat to the secondary fluid which is vaporized therein to supply turboelectric machines.

When the reactor operates at full power, the primary water is at a temperature of the order of 320° C. in the core, and to keep it in the liquid state the pressure in the primary circuit is maintained at about 155 bars. This pressure is regulated by the action of a pressurizer which operates by heating or spraying cold water. If, for example, the pressure tends to diminish, a portion of the water of the pressurizer is vaporized by a heating rod system so as to increase the volume and the pressure of the steam cushion which occupies the upper dome of the pressurizer, which pressure is communicated to the whole of the primary circuit through an expansion pipe opening into the bottom end of the pressurizer. On the contrary, a reduction in the primary pressure is obtained by sprinkling cold water on the vapor phase at the upper part of the pressurizer, which has the effect of condensing a portion of this vapor.

FIG. 1 shows, in extremely simplified diagrammatic manner, a prior art primary circuit denoted symbolically as a whole by 1 surrounded by a heavy mixed dash-dot line, which groups the core 2, a primary pump 3 and a steam generator 4. The expansion pipe of the pressurizer 5 is tapped on the hot water piping, between the core of the reactor and the steam generator.

Quite usually, a so-called "reactor chemical and volume control" system (RCV system) is arranged in parallel with the primary circuit. The RCV system includes a discharge line 8 with two successive expansion stages. The first "high pressure" stage is constituted by a system of expansion orifices 9; the regulating valve 10 constitutes the "low pressure" stage. Each expansion stage is normally preceded by a cooling stage (not shown in the diagram). The discharge flow rate in the line 8 is a function of the number of orifices 9 put into service.

The pressure in the discharge line is controlled by the valve 10, slaved to a pressure signal taken at 11 immediately upstream of the valve, and acting on the regulator 12. The RCV circuit then includes a volume control tank 13, normally provided with a level regulator (not shown in the diagram). The RCV circuit is closed by a charging line 14 comprising a pump 15 which reinjects into the primary circuit, through a charging regulating valve 17, the fluid discharged or the added supplementary water introduced at 16. The charging flow rate is servo-coupled through a regulator 18 to the water level measured at 19 in the pressurizer 5 and to the flow rate signal measured at 20 downstream of the valve 17.

The circuit 22 for sprinkling cold water on to the vapor phase of the pressurizer is taken as a branch line from the charging line 14 and ends at the sprinkling control valve 23.

When it is desired to shut down the reactor, after, of course, stopping the nuclear reactions by lowering the rods, it is necessary to bring the primary circuit back gradually to a lower temperature and pressure.

In the primary phase, which enables it to be brought to about 30 bars and 180°, steam is discharged to the principal condenser or to the atmosphere, keeping at least one primary pump in operation for uniform cooling of all the loops. At the same time, a sprinkling follows in the pressurizer to reduce the pressure, while maintaining a minimum value necessary to permit the operation of the pumps. During this primary phase the primary water contained in the pressurizer is in a bi-phase liquid-vapor state at saturation equilibrium.

In a subsequent second phase, and while keeping a primary pump in service, the cooling circuit of the reactor on shut-down is brought into play (RRA circuit) constituted by a closed circuit with tapping and delivery into the primary loops, a part of this delivery being effected at 25 (FIG. 1) in the RCV circuit. During this second phase however, wherein it is desired to reach a temperature of 70°, a pressure of at least 23 bars which is the minimum operating pressure of the primary pumps must be preserved. These conditions can only be reached in a mono-phase medium if it is desired to avoid thermal stresses which are too high on the expansion piping of the pressurizer. For this second phase it is therefore necessary to reabsorb the steam "bubble" located at the top of the pressurizer.

Although in the initial bi-phase condition it is the pressurizer which regulates the primary pressure, in a subsequent mono-phase condition the primary pressure will be regulated by the expansion valve 10 of the discharge line, the charging valve 17 then having a constant flow rate setting since the liquid level at the pressurizer is constant and maximum. The flow rate from the discharge line 8 is no longer provided through the high pressure expansion orifices 9 which are provided for a large pressure drop, but rather by the delivery at 25 from the RRA circuit.

However, the reabsorption of the steam bubble, between the bi-phase state and the mono-phase state, passes through an intermediate phase, and the bubble only occupies the very top part of the pressurizer, and during this phase the evolution of the liquid level cannot be followed since it is difficult to place measuring members in the upper part of the dome of the pressurizer close to the sprinkling ramps. In this intermediate phase the normal regulation by the low pressure discharge valve 10 presents the drawback of not taking the pressure from the primary directly as reference pressure, but of taking this from a circuit which is not representative of this primary pressure, either statically or dynamically. Hence it is not sufficient to control the pressure of the primary circuit reliably during the final reabsorption phase of the vapor bubble at the top point of the pressurizer.

For rapid pressure variations the bubble constitutes an adiabatic system which does not absorb heat. Hence it can only be reabsorbed with difficulty under the action of pressure, since this reabsorption must pass through a reequilibration of the temperature, which is a long and poorly defined action. Moreover, the indirect observation of the evolution of the bubble by examination of the charging and discharging flow rates is falsified by variations in volume of the primary circuit under the effect of temperature variations. This imprecision on the evolution of the bubble can lead to unforeseen excess pressure in the primary fluid capable, for example, of resulting in the opening of cooling circuit valves on shut-down.

OBJECT OF THE INVENTION

It is an object of the invention to provide a method for regulating the pressure in the primary circuit during the phases of shut-down of a pressurized water nuclear reactor, which overcome the aforesaid drawbacks.

It is another object of the invention to provide a method which enables effective and positive reabsorption of the latter portion of the vapor bubble by working at substantially constant pressure, and by monitoring the evolution of the bubble.

Other objects and features of the invention will be apparent from the description which follows.

SUMMARY OF THE INVENTION

According to the invention, there is provided a method for the regulation of the pressure of the primary circuit during the shut-down phases of a pressurized water nuclear reactor, wherein, when the level of the liquid reaches the upper portion of the pressurizer where the detection of the level becomes inoperative, a constant level is maintained at the charging pipe, the discharging flow rate is adjusted by rapid acting regulation from a direct measurement of the pressure of the primary circuit, successive sprinklings at the pressurizer then follow and the reduction in the discharging flow rate which is caused immediately by the reduction in pressure due to the condensation in the pressurizer is detected, and this until a further sprinkling no longer has an effect on the discharge flow rate, the cooling then being able to continue with pressure regulation of the primary through the discharge valve.

In a preferred embodiment of the invention, the method is rendered automatic by servo-coupling the flow rate of the sprinkling control valve from measurement of the discharge flow rate, by using a regulation with a slower reaction speed than that of the regulation of the discharge valve from the primary pressure.

BRIEF DESCRIPTION OF THE DRAWINGS

The invention will be more clearly understood by referring to a preferred embodiment given purely by way of illustrative example and shown in the accompanying drawings.

DETAILED DESCRIPTION OF A PREFERRED EMBODIMENT

Figure 2:
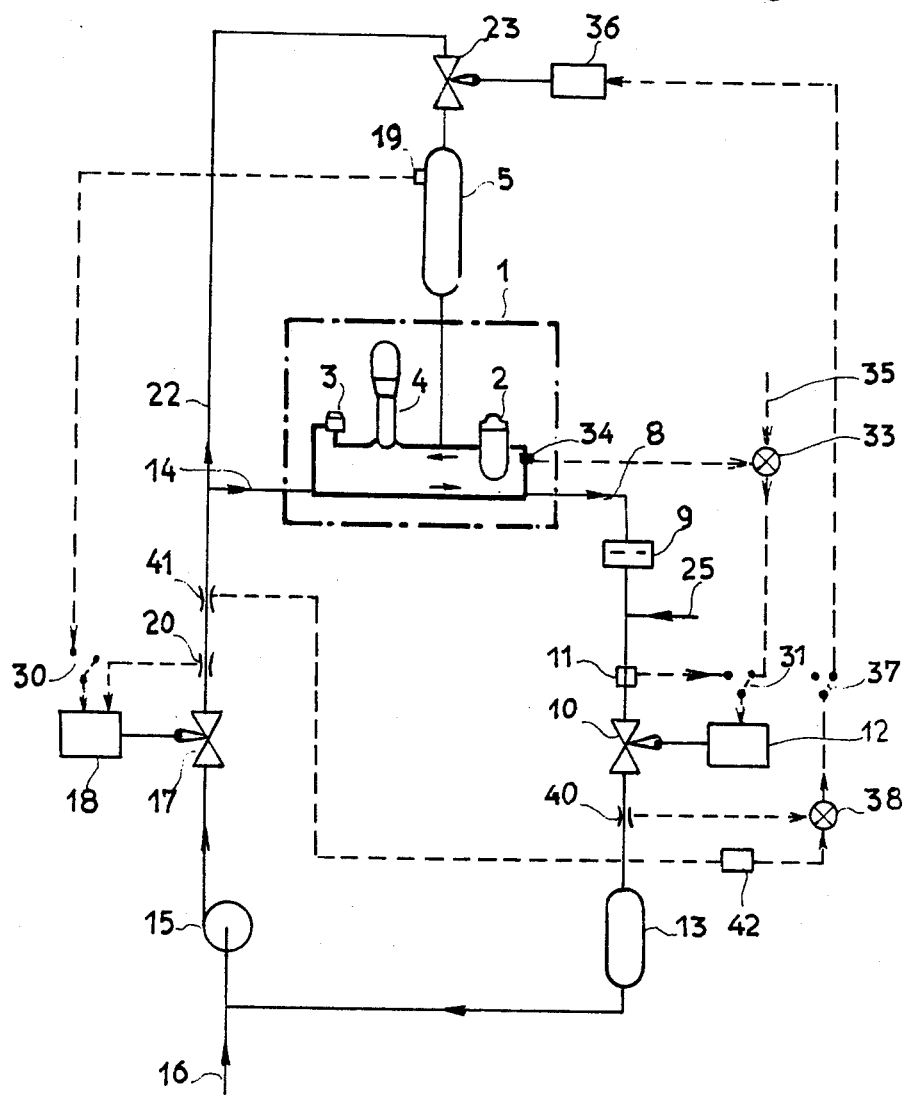
FIG. 2 shows a primary circuit similar to that of FIG. 1, but relating to an embodiment wherein the additional elements for practising the invention are included.

In FIG. 2 the measuring signal of the water level in the pressurizer, taken at 19, is applied to the regulator 18 of the charging valve 17 through a switch 30. In the same way, the regulation loop 12 of the discharging valve 10, from the pressure detector 11, passes through a switch 31 which receives an another stud the output signal of a comparator 33. The comparator 33 receives the signal from a pressure detector 34, mounted directly in the primary circuit of the reactor; a signal representing a reference pressure is applied through 35 to the comparator 33.

In addition, the regulating valve 23 for the sprinkling flow rate is controlled through a regulator 36 which, through a switch 37, receives the output signal from a comparator 38. The comparator 38 receives the signal from a flow rate detector 40 located downstream of the valve 10 in the discharge line, and the signal from a flow rate detector 41 located downstream of the valve 17 in the charging line; an increaser-decreaser 42 is inserted between the detector 41 and the comparator 38.

Figure 1:
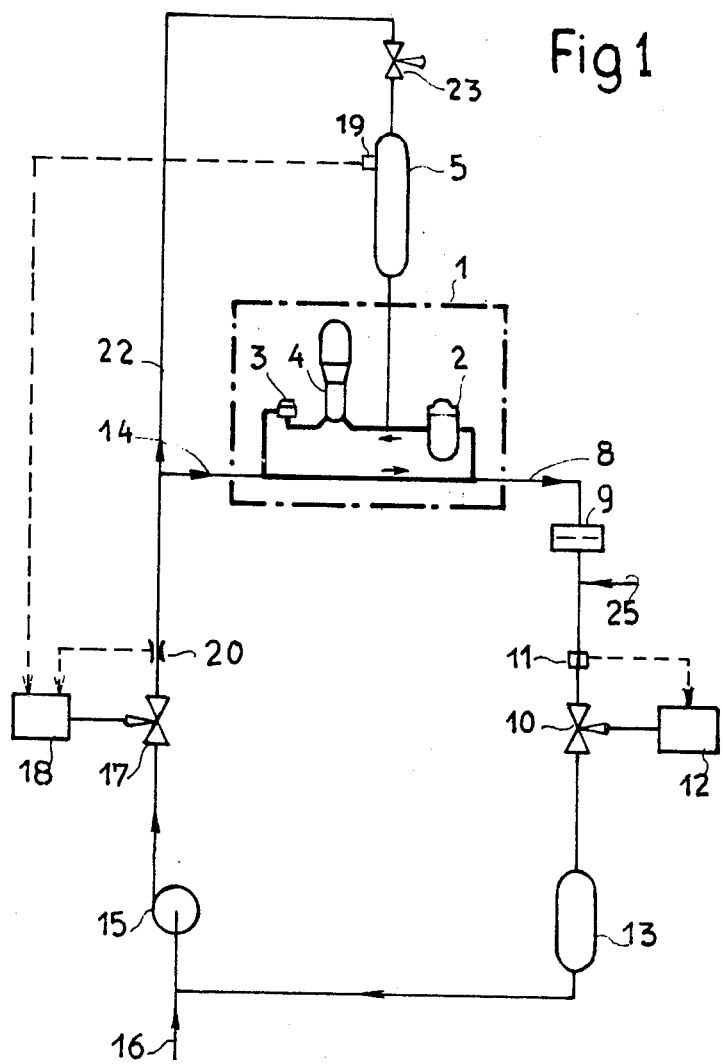
FIG. 1 shows in extremely simplified diagrammatic manner, a conventional primary circuit denoted symbolically by the general numeral 1 and surrounded by a dot-dash line.

When the three switches 30, 31 and 37 have swung to the left, the reverse of that which is shown in FIG. 2, all the regulation circuits are in the same state as in FIG. 1. It is under these conditions that the first phase of cooling the primary circuit is effected, with continuous sprinkling from the primary circuit, regulation of the discharge flow rate as a function of the pressure taken downstream of the high pressure expansion orifices 9, and regulation of the charging flow rate as as function of the water level in the pressurizer.

When the water level reaches the upper part of the pressurizer, and it is no longer possible to follow its development exactly, the switches are swung over to the position of FIG. 2, which permits the automatic resorption of the bubble by the bringing into action of two regulating circuits coupled and having different reaction speeds.

The charging flow rate is kept constant through the valve 17 whose regulator 18 is isolated from the measurement 19.

The comparison, at 33, of the actual primary pressure measured at 34, with a reference pressure set by 35, controls through the high reaction speed regulator 12 the opening of the discharge valve 10 and creates a discharging flow rate. This discharging flow rate is measured at 40, and compared at 38 with a developed reference flow rate, by decrease at 42, from the charging flow rate measured at 41. The signal resulting from this comparison is applied to the lower speed reaction regulator 36 which controls the opening of the valve 23 and results in sprinkling of the pressurizer. This sprinkling results in a condensation of vapor and reduction in the primary pressure; the primary pressure drop is immediately reflected by the circuit 34-33-12 in a reduction in the opening of the discharge valve 10, and the sprinkling is maintained until the reduction of the discharging flow rate to its reference value. This operation is repeated until the action on the decreaser 42 no longer has an effect on the discharge flow rate. It is then certain that the bubble has been resorbed. At this time there is in fact no longer condensation of steam requiring replacement by an equivalent volume of water, but all proceeds as if all the charging flow rate were directly introduced into the piping of the primary circuit, without by-pass to the sprinkling of the pressurizer; the only effect of the sprinkling is then that of cooling the pressurizer and homogenizing the temperature of the latter with that of the circuit.

After disappearance of the bubble, the cooling can continue with regulation of the pressure through the discharge valve.

It is also possible to provide still more complete automation by causing the development through a mini-computer of the switching functions of the regulation modes before complete collapse of the vapor bubble and of the sprinkling control functions for the end of resorption of the bubble through successive levels, or continuously.

It will also be noted that these regulating circuits can also, on the contrary, be used to pass from a mono-phase state to a bi-phase state, if a regulator homologous with the regulator 36 is used for controlling the vaporization heating rods in the pressurizer. Then there is developed for the comparator 38, a reference signal increased at 42 with respect to the measuring signal of the charging flow rate at 41, and the process is then the reverse of that which was described above when the signal from 41 was decreased at 42.

The regulating method can be carried out manually by proceeding with successive sprinklings by direct action on the valve 23, and by detecting by a simple measurement of the flow rate at 40 if this sprinkling has resulted in a condensation of vapor, hence a drop in the primary pressure and an immediate variation in the discharge flow rate.

What is claimed is:

1. In a method for regulating the pressure of the primary circuit of a pressurized water nuclear reactor during shut-down phases, for use in an installation comprising, as a branch circuit to the primary circuit, a volume control circuit with a discharge valve of the primary circuit, a volume control tank, and a pump for reinjection to the primary circuit through a charging valve, the primary circuit being connected to a steam-liquid pressurizer provided with a circuit for sprinkling the vapor phase controlled by a valve supplied from the charging pipe of the volume control circuit, according to which method, during cooling of the circuit by discharge of secondary steam, continuous sprinkling of cold water on the steam contained in the pressurizer is effected, the discharge flow rate is regulated as a function of a pressure measurement taken immediately upstream of the discharge valve and after an upstream expansion stage, and the charging flow rate is regulated as a function of the liquid level in the pressurizer, the improvement comprising the steps, when the liquid level reaches the upper part of said pressurizer where level detection becomes inoperative, of (a) maintaining a constant flow rate at the charging pipe;

(b) regulating the discharge flow rate by rapid acting regulation from direct measurement of the pressure of said primary circuit;

(c) performing a first one of a series of successive sprinklings at said pressurizer to reduce the discharge flow rate to a reference value;

(d) detecting after said first sprinkling the reduction in discharge flow rate which is immediately caused by the pressure reduction due to the condensation in the pressurizer;

(e) continuing alternatingly successive sprinklings and detections until further sprinkling has no further effect on the discharge flow rate; and (f) continuing cooling of the pressurizer with pressure regulation by said discharge valve.

2. The improvement according to claim 1, comprising the step of rendering said method automatic by servo-coupling the flow rate of the sprinkling control valve from the measurement variations in the discharge flow rate, by using a regulation with a slower reaction speed than that of the regulation of the discharge valve from the direct measurement of the pressure in the primary circuit.

* * * * *